Patented Feb. 21, 1933

1,898,748

UNITED STATES PATENT OFFICE

ARNOLD SHEPHERDSON AND WILLIAM WYNDHAM TATUM, OF BLACKLEY, MANCHESTER, ENGLAND, ASSIGNORS TO IMPERIAL CHEMICAL INDUSTRIES LIMITED, OF LONDON, ENGLAND

DYES OF THE ANTHRAQUINONE SERIES

No Drawing. Original application filed April 13, 1929, Serial No. 354,978, and in Great Britain April 19, 1928. Divided and this application filed October 10, 1929. Serial No. 398,808.

This invention relates to the production of new sulphonated anthraquinone derivatives; and it comprises a process wherein certain anthraquinone derivatives are treated with a suitable sulphonating agent, for instance soluble alkali sulphites, thereby converting them into the corresponding sulphonated anthraquinone derivatives; and it further comprises the new sulphonated anthraquinone thus produced; all as more fully hereinafter set forth and as claimed.

Our new sulphonated anthraquinone derivatives may be represented by the probable general formula

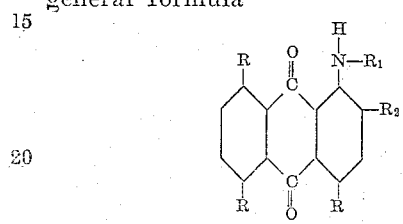

wherein $R_1$ represents hydrogen or an alkyl group, $R_2$ represents hydrogen, a halogen or a sulphonic group and R represents a residue having the probable formula

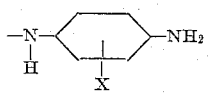

wherein X represents hydrogen or a sulphonic group, and which contain only one such residue and at least one sulphonic group. We have found that such new sulphonated anthraquinone derivatives may be advantageously used as dyes for various materials. These new compounds dye wool, silk and immunized cotton in level fast shades in an advantageous manner. These dyes give level fast bluish-green to green shades on wool.

In our copending application Ser. No. 354,978 of which the present application is a division, we describe the manufacture of new anthraquinone derivatives. These new anthraquinone derivatives may be represented by the probable general formula

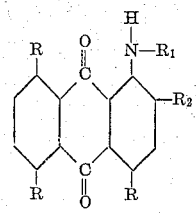

wherein R represents hydrogen or an alkyl group, $R_2$ represents hydrogen, a halogen or a sulphonic group and R represents a residue having the following formula

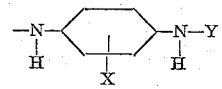

wherein X represents hydrogen or a sulphonic group and Y represents hydrogen or an acyl group. Such anthraquinone derivatives are made by a process which comprises condensing phenylenediamine compounds having the probable formula

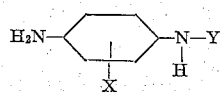

wherein X represents hydrogen or a sulphonic group and Y represents hydrogen or an acyl group, with anthraquinone derivatives having the probable formula

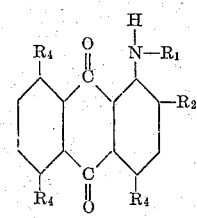

wherein $R_1$ represents hydrogen or an alkyl group, $R_2$ represents hydrogen, a halogen or a sulphonic group and $R_4$ represents hydrogen or a halogen and in which only one $R_4$ is a halogen. As stated in our above-identified copending application, we have found that the condensation of an alpha-halogenated anthraquinone with para-phenylenediamine proceeds much more smoothly in an aqueous medium than in an organic solvent free from water. This is surprising as in the usual processes using simple aryl amines instead of phenylenediamine, the condensation is effected in an organic solvent which must be free from traces of water. The products referred to above and obtained by our new method are pure and the yield is improved; an economy of materials being effected.

In the process of our above identified application, when it is desirable to produce sulphonated condensation products it is necessary to use compounds which initially contain a sulphonic group.

The present invention relates to a different and modified process of producing sulphonated anthraquinone derivatives of the type disclosed in our above identified application. In our present process we first effect a condensation in a manner similar to that of our prior process and then subsequently treat the condensation product thus formed with a suitable sulphonating agent to introduce the desired sulphonic groups. Our present process comprises condensing a phenylenediamine compound having the probable formula

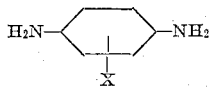

wherein X represents hydrogen or a sulphonic group, with an anthraquinone compound having the probable formula

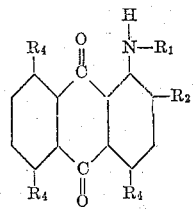

wherein $R_1$ represents hydrogen or an alkyl group, $R_2$ represents hydrogen, a halogen or a sulphonic group and $R_4$ represents a hydrogen or a halogen and in which only one $R_4$ represents a halogen and then treating the condensation product thus obtained with a sulphonating agent. The sulphonating agent may be 20 per cent oleum and the sulphonation may be effected in the manner indicated in Example 2, again with condensation products which contain a halogen in the 2 position on the anthraquinone nucleus, the condensation product may be treated with a soluble alkali metal sulphite, thereby introducing a nuclear sulphonic group. For instance sodium sulphite may be used. In our present process we may use unsulphonated anthraquinone condensation products or anthraquinone condensation products which contain only one sulphonic group. Our present process produces a sulphonated or further sulphonated anthraquinone derivative of the above indicated type. Our method using a halogenated condensation product and treating the same with a soluble alkali metal sulphite is particularly advantageous. These halogenated anthraquinone derivatives have the probable formula

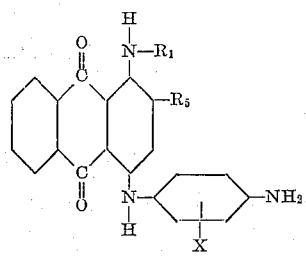

wherein $R_1$ represents hydrogen or a methyl group, X represents hydrogen or a sulphonic group and $R_5$ represents a halogen. The treatment with the soluble alkali metal sulphite replaces the halogen with a sulphonic group.

Our application Ser. No. 354,978 is specifically directed to anthraquinone derivatives in which the $R_5$ is hydrogen or halogen. The present application is specifically directed to the anthraquinone derivatives wherein $R_5$, in the final products, is a sulphonic group. It is further directed to a process wherein sulphonic groups are introduced into the anthraquinone compounds by a subsequent sulphonating treatment.

The following typical examples illustrate our invention and serve to guide those skilled in the art in using our broad invention to the best advantage. In the examples the parts are by weight.

*Example 1*

Preparation of 1-amino-4-(p-amino-anilino) anthraquinone-2-sulphonic acid.

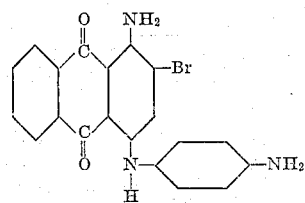

10 parts of 2:4-dibromo-1-amino anthraquinone together with 5 parts of p-phenylenediamine and half a part of copper acetate are fed into 90 parts of 15 per cent caustic soda solution and boiled (at about 106° C.) for 2 hours. The precipitated base after filtering and washing with dilute acid may be purified by extraction with sulphuric acid of suitable strength such as 65 per cent. It is thereby obtained in the form of a blue powder insoluble in water or alkalies but giving a red solution with hydrochloric acid.

The remaining bromine atom is now replaced by the sulphonic acid group, for example, by heating with sodium sulphite at 165° C. in aqueous phenol solution. The resultant sulphonic acid dissolves with a blue colour in water or alkalies the solution becoming red when strongly acidified. The solution in methylated spirits is blue and in sulphuric acid blue changing to green on addition of formaldehyde. From an acidulated bath, the new sulphonic acid dyes wool in level bluish-green shades of excellent fastness. It has the probable formula

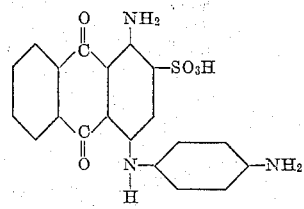

*Example 2*

Preparation of sulphonated-1-methyl amino-4-(p-amino-anilino) anthraquinone.

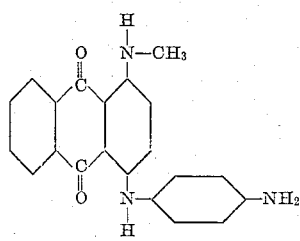

A mixture of 10 parts of 4-bromo-1-methylamino anthraquinone, 6 parts of p-phenylenediamine and ½ part of copper acetate are introduced into 90 parts of hot saturated potassium carbonate solution (about 63 per cent). The whole is heated at 130° C. for 3 hours, then diluted with water. The new dyestuff formed is insoluble and is filtered off and washed with dilute hydrochloric acid. When crystallized from aniline it forms green crystals insoluble in water or dilute caustic soda solution but giving a red solution in concentrated hydrochloric acid. Its solution in sulphuric acid is purple changing to a bluish-green on addition of formaldehyde. The solutions in acetic acid or methylated spirits are greenish-blue. The new dyestuff shows good affinity for acetate silk which is dyed in bluish-green shades of excellent fastness. On treatment with 20 per cent oleum at 40° C. it is converted into a soluble sulphonic acid which dyes wool in bluish-green shades.

What we claim and desire to secure by Letters Patent is:—

1. In the manufacture of new anthraquinone dyestuffs from paraphenylenediamine compounds, the process which comprises condensing paraphenylenediamine with a halogenated anthraquinone compound having the probable formula

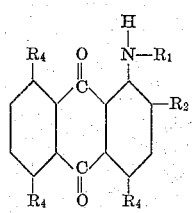

wherein $R_1$ represents hydrogen or an alkyl group, $R_2$ represents hydrogen, a halogen or a sulphonic group and $R_4$ represents a hydrogen or a halogen and in which only one $R_4$ represents a halogen said condensation being effected in an alkaline aqueous medium and then treating the condensation product thus obtained with a sulphonating agent.

2. In the manufacture of new anthraquinone dyestuffs the process which comprises condensing paraphenylenediamine with a halogenated anthraquinone compound having the probable formula

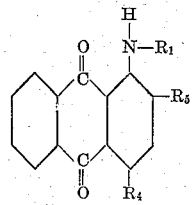

wherein $R_1$ represents hydrogen or an alkyl group, $R_5$ and $R_4$ represent a halogen said condensation being effected in an aqueous solution of caustic soda and then treating the condensation product thus obtained with a soluble alkali metal sulphite.

3. In the manufacture of new anthraquinone dyestuffs, the process which comprises condensing paraphenylenediamine with 2:4-dibromo-1-aminoanthraquinone in an alkaline aqueous medium and then treating the condensation product thus obtained with sodium sulphite.

4. As new products, sulphonated anthraquinone compounds suitable as dyestuffs and having the probable formula

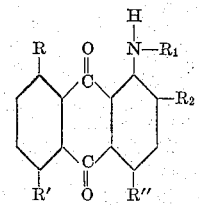

wherein $R_1$ represents hydrogen or alkyl group, $R_2$ represents hydrogen, halogen or a sulphonic group and $R$ represents hydrogen or a residue having the probable formula

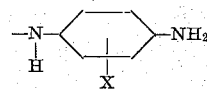

wherein X represents hydrogen or a sulphonic group, and which contains only one such residue and at least one sulphonic group and in which when $R_2$ and $R''$ represent hydrogen and said residue respectively, $R_1$ represents an alkyl group, the said anthraquinone compounds being blue to green powders soluble in water and alkalies giving a solution having a blue colour which upon being strongly acidified becomes red, and being soluble in methylated spirits giving a blue solution and being soluble in sulphuric acid giving a blue solution which on addition of formaldehyde changes to green, the said anthraquinone compounds dyeing wool in level fast bluish green shades.

5. As new products, sulphonated anthraquinone compounds suitable as dyestuffs and having the probable formula

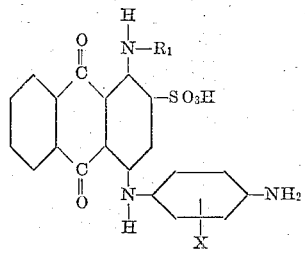

wherein $R_1$ represents hydrogen or an alkyl group, and X represents hydrogen or a sulphonic group and in which when X represents a sulphonic group $R_1$ represents an alkyl group, the said anthraquinone compounds being blue to green powders soluble in water and alkalies giving a solution having a blue colour which upon being strongly acidified becomes red, and being soluble in methylated spirits giving a blue solution and being soluble in sulphuric acid giving a blue solution which on addition of formaldehyde changes to green, the said anthraquinone compounds dyeing wool in level fast bluish green shades.

6. As a new product, the sulphonated anthraquinone compound suitable as a dyestuff and having the probable formula

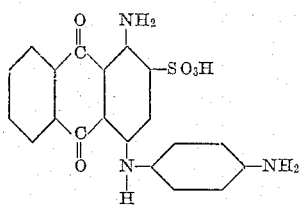

the said anthraquinone compound being soluble in water and alkalies giving solutions having a blue colour which upon being strongly acidified becomes red, and being soluble in methylated spirits giving a blue solution and being soluble in sulphuric acid giving a blue solution which on addition of formaldehyde changes to green, the said anthraquinone compounds dyeing wool in level, fast, bluish-green shades.

7. In the manufacture of new anthraquinone dyestuffs, the process which comprises condensing a phenylenediamine compound having the probable formula

with a halogenated anthraquinone compound having the probable formula

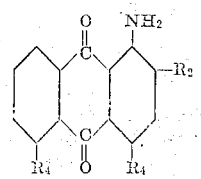

wherein $R_2$ represents a halogen and $R_4$ represents a halogen or hydrogen, and in which only one $R_4$ is a halogen and said condensation being effected in an alkaline aqueous medium then treating the condensation product thus obtained with sodium sulphite.

8. In the manufacture of new anthraquinone dyestuffs, the process which comprises condensing a phenylenediamine compound having the probable formula

with a halogenated anthraquinone compound having the probable formula

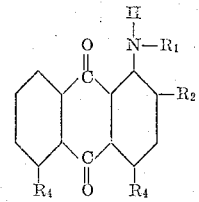

wherein $R_1$ represents hydrogen or a methyl group, $R_2$ represents hydrogen, a halogen or a sulphonic group and $R_4$ represents a halogen or hydrogen, and in which only one $R_4$ is a halogen, said condensation being effected in the presence of an aqueous solution of an alkaline carbonate and then treating the condensation product thus obtained with oleum.

9. In the manufacture of new anthraquinone dyestuffs, the process which comprises condensing a phenylenediamine compound having the probable formula

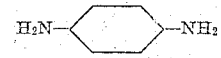

with a halogenated anthraquinone compound having the probable formula

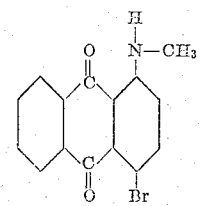

an alkaline aqueous medium and then treating the condensation product thus obtained with oleum.

10. As a new product, a sulphonated anthraquinone compound suitable as dyestuff and having the probable formula

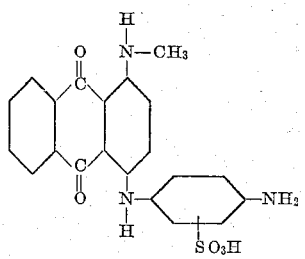

the said dyestuff dyeing wool in bluish-green shades.

11. As new products, sulphonated anthraquinone compounds suitable as dyestuffs and having the probable formula

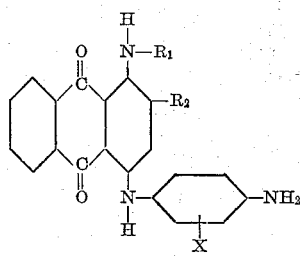

wherein $R_1$ represents hydrogen or an alkyl group and $R_2$ and X represent hydrogen or a sulphonic group and in which when X represents a sulphonic group $R_1$ represents an alkyl group, the said compounds containing only one sulphonic group.

12. In the manufacture of new anthraquinone dyestuffs, the process which comprises mixing together about 10 parts of 2:4-dibromo-1-aminoanthraquinone with about 5 parts of para-phenylenediamine, a small amount of copper acetate and a 15 per cent caustic soda solution, heating the aqueous mixture thus obtained to about 106° C. until reaction and condensation have been effected, isolating and recovering the condensation product thus obtained, mixing the said condensation product with sodium sulphite in an aqueous phenol solution, heating the mixture to about 165° C. until a soluble sulphonic acid is obtained and recovering said sulphonic acid.

13. In the manufacture of new anthraquinone dyestuffs, the process which comprises mixing together about 10 parts of 4-bromo-1-methylaminoanthraquinone, about 6 parts of para-phenylenediamine, a small amount of copper acetate and a hot saturated potassium carbonate solution, heating the aqueous mixture thus obtained to about 130° C. until reaction and condensation are effected, isolating and recovering the condensation product thus obtained, mixing the said condensation product with 20 per cent oleum, heating the mixture to about 40° C. until a soluble sulphonic acid is obtained and then isolating said sulphonic acid.

14. In the manufacture of new anthraquinone dyestuffs, the process which comprises mixing together a halogenated anthraquinone compound having an amino grouping in the 1-position and a halogen substituent in the 4-position with approximately an equimolecular proportion of para-phenylenediamine and a small amount of copper acetate in an alkaline aqueous medium, heating the aqueous mixture thus obtained until reaction and condensation are effected, isolating and recovering the condensation product thus obtained and then reacting said condensation product with a sulphonated agent to convert said condensation product into a soluble sulphonic acid derivative.

In witness whereof we affix our signatures.
ARNOLD SHEPHERDSON.
WILLIAM WYNDHAM TATUM.